Figure 1:
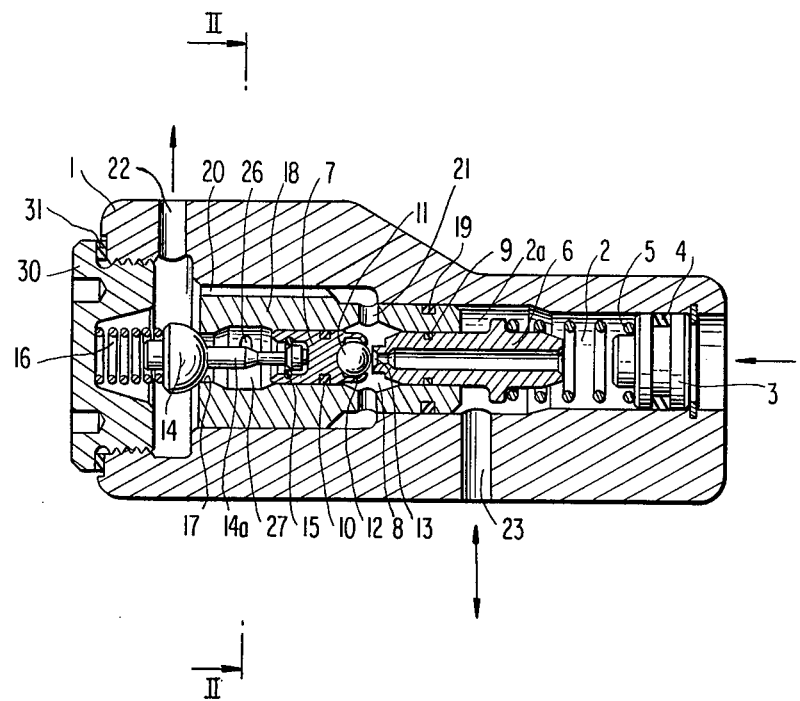

United States Patent [19]

Resch

[11] 4,236,763
[45] Dec. 2, 1980

[54] BRAKE VALVE ESPECIALLY FOR MOTOR VEHICLES

[75] Inventor: Reinhard Resch, Stuttgart, Fed. Rep. of Germany

[73] Assignee: Daimler-Benz Aktiengesellschaft, Fed. Rep. of Germany

[21] Appl. No.: 2,379

[22] Filed: Jan. 10, 1979

[30] Foreign Application Priority Data

Jan. 18, 1978 [DE] Fed. Rep. of Germany ....... 2802029

[51] Int. Cl.$^3$ .............................................. B60T 15/06
[52] U.S. Cl. ..................................... 303/54; 303/6 R
[58] Field of Search ..................... 303/6 C, 6 R, 22 R, 303/24 C, 24 F, 54

[56] References Cited

U.S. PATENT DOCUMENTS

| | | | |
|---|---|---|---|
| 2,324,690 | 7/1943 | Gardiner et al. | 303/54 |
| 2,381,222 | 8/1945 | May | 303/54 |
| 2,698,205 | 12/1954 | Gagen | 303/54 |
| 3,684,330 | 8/1972 | Kito | 303/54 |

*Primary Examiner*—Duane A. Reger
*Attorney, Agent, or Firm*—Craig & Antonelli

[57] ABSTRACT

A brake valve for a control piston actuatable at will, which shifts a double valve by way of a spring that closes off a flow connection between a working pressure space and a supply reservoir for pressureless brake medium and which during the further movement opens up the inlet between a pressure storage device containing a brake medium under pressure and the working pressure space. A closure member constructed spherically within its sealing area, which together with a stem mounted thereon forms a valve body, is tied to a valve piston by way of this stem in such a manner that the valve member is connected in its longitudinal direction with the valve piston but is radially freely movable with respect thereto to thereby assure centering of the valve member with respect to the valve seat.

12 Claims, 2 Drawing Figures

U.S. Patent

Dec. 2, 1980

4,236,763

BRAKE VALVE ESPECIALLY FOR MOTOR VEHICLES

The present invention relates to a brake valve, especially for motor vehicles, with a control piston adapted to be actuated at will mechanically or hydraulically, which shifts by way of a spring a double-valve that closes off a flow connection between a working pressure space and a reservoir tank or container for a pressureless brake medium and which during the further movement opens up the inlet between a pressure storage device containing a brake medium under pressure and the working pressure space.

Brake valves which operate in this manner are known in the art. However, the prior art constructions frequently exhibit shortcomings in principle. If these valves open, for example, against a storage pressure, then they require high response forces. Other valves which do not open against storage pressure are constructed predominantly as pressure-equalized cone valves having a rigidly guided stem axis as, for example, the closure member 48 according to the German Auslegeschrift 23 59 303. This, however, entails the disadvantage that the rigid guide axis of the valve stem does not permit any radial offset of the valve cone relative to the valve seat, whence a leakage-free sealing is not assured.

It is the aim of the present invention to provide a brake valve which does not entail the aforementioned shortcomings and which is equipped with simple structural parts.

The underlying problems are solved according to the present invention in that a closure member constructed spherically within the sealing area, which together with a stem provided thereon forms a valve body or valve member, is tied by way of this stem to a valve piston in such a manner that the valve body is connected in its longitudinal direction with the valve piston but is freely movable radially and as a result thereof the valve body is forcibly centered with respect to the associated valve seat. Additionally, the valve is constructed of such shape that the piston area, which is acted upon by the storage pressure, is equal to the cross-sectional area of the part of the valve closure member acted upon by the storage pressure. As a result thereof, the valve shifting force remains uninfluenced by the storage pressure by reason of the area equality of the cross sections acted upon by the storage pressure.

Accordingly, it is an object of the present invention to provide a brake valve, especially for motor vehicles, which avoids by simple means the aforementioned shortcomings and drawbacks encountered in the prior art.

Another object of the present invention resides in a brake valve, especially for motor vehicles, which obviates the need for high response forces, yet assures a completely leakage-free sealing.

A further object of the present invention resides in a brake valve which is relatively easy to manufacture and assemble and involves only relatively simple structural parts.

Still a further object of the present invention resides in a brake valve of the type described above in which the valve shifting force remains uninfluenced by the pressure of the storage device.

Figure 2:
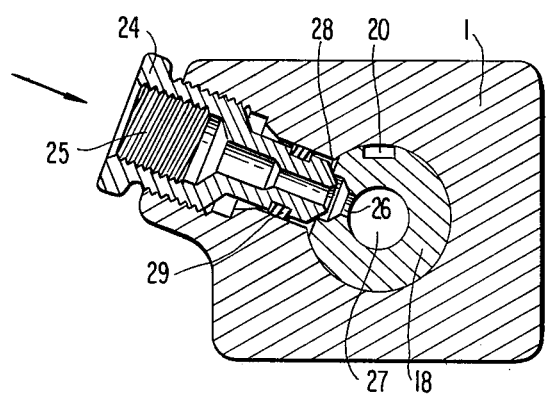

These and other objects, features and advantages of the present invention will become more apparent from the following description when taken in connection with the accompanying drawing which shows, for purposes of illustration only, one embodiment in accordance with the present invention, and wherein:

FIG. 1 is a longitudinal cross-sectional view through a brake valve according to the present invention; and FIG. 2 is a transverse cross-sectional view taken along line II—II of FIG. 1.

Referring now to the drawing wherein like reference numerals are used throughout the two views to designate like parts, the drawing illustrates a valve housing 1, in which a control piston 3 having a seal 4 is arranged in a bore 2 thereof. The control piston 3 is supported at a valve plunger or valve follower 6 by way of a spring 5 and, upon actuation, the control piston 3 shifts a double valve means, described more fully hereinafter, by way of the spring 5. The valve plunger 6 and the valve piston 7 are sealingly guided in a common bore 8 by means of a respective seal 9 and 10 each. A ball 11 is retained at the valve piston 7 by a flanged-over rim 12. The ball 11 and a bore in the valve plunger 6 constructed as valve seat 13 form an outlet valve. A valve stem 14a provided with a partly spherical closure member 14 is tied to the valve piston 7 by means of a retaining ring 15 so as to connect the closure member in its longitudinal direction with the valve piston 7 but enable the closure member 14 to be radially freely movable with respect to the valve piston 7. The closure member 14 at the stem 14a is forced by a spring 16 against a valve seat 17. A valve bush 18 having a seal 19 is received by an enlarged section 2a of the bore 2. A groove 20 and radial bores 21 are provided in the valve bush 18, by way of which a flow connection exists between a bore 22 and the bore 13 constructed as valve seat as well as a further bore 23. The valve sleeve 18 is positioned by a threaded member 24 in the form of a screw or bolt (FIG. 2). Additionally, a flow connection exists between an offset connecting bore 25 (FIG. 2) and a further bore 26 leading to a storage pressure space 27 formed on the inside of the valve sleeve 18. The threaded member 24 seals off end face with respect to the valve bush 18 by means of a knife edge or wedge-shaped seal 28. The threaded stem of the threaded member 24 is sealed off by a seal 29. The valve housing 1 is closed off by means of a threaded plug 30 and a sealing ring 31.

The connection 25 is in communication with a pressure storage device (not shown), while bore 23 is connected with a supply reservoir (not shown) and the connection 22 is in direct communication with a brake circuit or with a working pressure space of a booster or servo-amplifier.

During actuation of the brake, the control piston 3 which is actuatable mechanically, hydraulically or in any other suitable manner, is displaced by an actuating mechanism (not shown) in the direction toward the valve plunger or valve follower 6. The spring 5 transmits the actuating force onto the valve plunger or valve follower 6 which, after overcoming the friction force, comes sealingly into abutment at the valve ball 11. As a result thereof, the return is closed off or blocked. With an increase of the actuating force, also the valve piston 7 and the valve closure body 14, 14a are displaced, after overcoming the friction forces, against the spring force of the spring 16. The valve closure member 14, 14a lifts off from the valve seat 17. Pressure medium flows from the pressure storage device by way of the connection 25, the bore 26, the storage pressure space 27 through the open valve 14, 17 and the bore 22 directly to a brake circuit or a working pressure space of a booster.

Simultaneously, the pressure medium flows by way of a groove 20 and the bores 21 into a space 8.

The end face of the valve plunger 6 is acted upon by a controlled pressure. As a result of the now effective reaction force, the valve plunger 6 is displaced against the spring force 5 into equilibrium position; the valve 11, 13 thereby remains closed. Additionally, the closure member 14 is again forced against the valve seat 17 by the spring 16.

The adjusted pressures are proportional to the spring forces of the spring 5.

When retracting the pedal force, the spring 5 is relieved. As a result thereof, the valve plunger 6 lifts off from the ball 11. A flow connection to the supply reservoir now is opened up by way of the bores 13 and 23.

As a result thereof, the working pressure drops off and the brake is disengaged.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A brake valve, comprising a control piston actuatable at will for shifting a double valve means by way of a spring, said double valve means being operable upon actuation of the control piston to close a flow connection between a brake circuit means and a pressureless brake medium reservoir and being operable during further movement to open up an inlet between a pressure storage device containing a brake medium under pressure and the brake circuit means, characterized in that the double valve means includes a valve member and a valve piston, said valve member is constructed as a closure member having an at least partially spherical sealing area and a stem extending from the sealing area, means are provided for connecting an end of the stem remote from the sealing area to the valve piston so as to fix the closure member to the valve piston in a longitudinal direction but permit the closure member to be radially freely movable with respect to the valve piston whereby the valve member is centered with respect to an associated valve seat.

2. A brake valve according to claim 1, characterized in that the valve piston includes a piston surface acted upon by storage pressure of the storage pressure device, and in that the piston surface is equal to a cross-sectional area of a part of the valve member acted upon by the same pressure.

3. A brake valve according to one of claims 1 or 2, characterized in that said double valve means further includes a valve plunger adapted to be actuated by the control piston through the spring and a sleeve means provided with a bore means, said valve piston is slidable within said bore means in an axial direction thereof when actuated by the valve plunger.

4. A brake valve having a valve housing, comprising a control piston actuatable at will for shifting a double valve means by way of a spring, said double valve means being operable to close a flow connection between a brake circuit means and a pressureless brake medium reservoir and being operable during further movement to open up an inlet between a pressure storage device containing a brake medium under pressure and the brake circuit means, characterized in that the double valve means includes a closure member constructed at least partially spherically within its sealing area and which together with a stem provided thereat forms a valve member, said closure member being so tied by way of said stem to a valve piston forming part of said double valve means that the valve member is operatively connected in a longitudinal direction with the valve piston but is radially freely movable with respect thereto and as a result thereof the valve member is centered with respect to an associated valve seat, said double valve means further includes a valve plunger and a sleeve means provided with a bore means, said valve piston being slidable within said bore means in an axial direction thereof when actuated by the valve plunger which in turn is actuated by the control piston by way of the spring, a first space provided within said sleeve means between said valve piston and said closure member form a storage pressure space, a first connection is adapted to connect the storage pressure space with the pressure storage device, a second connection adapted to be connected with the brake circuit means is provided in the valve housing and leads to a second space which is adapted to be closed off from said storage pressure space by said closure member, a third connection is provided is said valve housing and is adapted to be connected with the brake medium reservoir, said third connection leading to a third space in said valve housing which surrounds said valve plunger, a bore is provided in said plunger for communicating said third space with a fourth space, a valve element is provided on the valve piston for closing off said bore, said fourth space is disposed between said plunger and said valve piston, and in that means are provided for communicating the fourth space with the second space.

5. A brake valve according to claim 4, characterized in that the means for closing off the bore in said valve plunger is a valve ball mounted at an end of the valve piston facing the valve plunger.

6. A brake valve according to claim 4, characterized in that said first connection includes a threaded connecting member.

7. A brake valve according to one of claims 4, 5, or 6, characterized in that the valve piston includes a piston surface acted upon by storage pressure of the storage pressure device, and in that the piston surface is equal to a cross-sectional area of a part of the valve member acted upon by the same pressure.

8. A brake valve according to claim 1, characterized in that the means for connecting an end of the stem to the valve piston includes a retaining ring means for mounting the end of the stem at the valve piston.

9. A brake valve according to claim 8, characterized in that the double valve means further includes a valve plunger interposed between the spring and the valve piston, means are provided in the valve plunger for communicating with the brake medium reservoir, and in that a further valve member is provided for controlling the communicating means in the valve plunger.

10. A brake valve according to claim 9, characterized in that a pressure storage space is provided between the closure member and the valve piston, means are provided for communicating the pressure storage space with the pressure storage device, and in that said closure member controls a communication between the pressure storage space and the brake circuit means.

11. A brake valve according to one of claims 9 or 10, characterized in that the further valve member is a valve ball mounted on an end of the valve piston facing the valve plunger.

12. A brake valve according to claim 11, characterized in that a further spring is provided for normally urging the closure member into engagement with the associated valve seat.

* * * * *